United States Patent [19]

Carroll

[11] Patent Number: 4,906,901
[45] Date of Patent: Mar. 6, 1990

[54] POWER SUPPLY FOR OUTDOOR LIGHTING SYSTEMS USING HIGH FREQUENCY

[75] Inventor: David T. Carroll, Sonoma, Calif.

[73] Assignee: GardenAmerica Corporation, Carson City, Nev.

[21] Appl. No.: 237,781

[22] Filed: Aug. 29, 1988

[51] Int. Cl.$^4$ .............................................. H01K 1/00
[52] U.S. Cl. ................................... 315/297; 315/210; 315/219; 315/254; 315/307; 315/312; 315/277
[58] Field of Search ................... 315/127, 161, 200 R, 315/201, 202, 205, 206, 254, 255, 277, 294, 297, 307, 210, 219

[56] References Cited

U.S. PATENT DOCUMENTS

| | | | |
|---|---|---|---|
| 4,464,606 | 8/1984 | Kane | 315/225 X |
| 4,488,090 | 12/1984 | Hancock | 315/201 |
| 4,506,318 | 3/1985 | Nilssen | 315/201 X |
| 4,591,764 | 5/1986 | Nilssen | 315/312 |

Primary Examiner—James J. Groody
Assistant Examiner—Mark R. Powell
Attorney, Agent, or Firm—Barry E. Deutsch

[57] ABSTRACT

A power supply for outdoor lighting systems accepts ordinary household alternating current of 120 volts at 60 hertz. The power supply uses a digital switching means to convert this current into a lower voltage at a higher frequency. Typically, these values are 28 volts at 20 kHz. This high frequency signal is then supplied to the lights through a transformer. The use of a higher voltage than that normally used for such systems improves the operating efficiency of the lighting system and allows lights to be placed at a greater distance from the power supply. The higher frequency signal reduces the bulk and cost of the transformer. The voltage and current supplied to the lights can be altered by changing the frequency of the signal entering the transformer. A feedback circuit monitors the signal supplied to the lights and automatically varies the frequency so as to keep the voltage and current within predetermined operating limits.

27 Claims, 5 Drawing Sheets

POWER SUPPLY FOR OUTDOOR LIGHTING SYSTEMS USING HIGH FREQUENCY

FIELD OF THE INVENTION

This invention relates to the field of outdoor lighting systems, and more particularly to power supplies for outdoor lighting systems.

BACKGROUND OF THE INVENTION

There are many uses for outdoor lighting systems. People often find it desirable to have such outdoor lights located around their homes. The lights add aesthetic beauty to the house, provide an element of security by illuminating dark areas, and often increase the value of house and property. Parks and other public areas also benefit from the use of outdoor lights.

One limitation on the use of outdoor lights, however, is that outdoor lights typically operate at a voltage level less than that of ordinary household current. Previously, transformers have been used to convert 120VAC to the desired voltage level. However, these transformers were often large and bulky, an unwanted feature. It is desirable to have a power supply that is modular in nature, and which takes up as little room as possible. Also, in the prior art systems, only a limited number of lights could be used, and the distance such lights could be placed from the power supply was also restricted.

SUMMARY OF THE INVENTION

It has been found that the aforementioned problems can be overcome with the use of a power supply that utilizes a signal with a lower voltage and higher frequency. The present invention comprises a power supply that accepts standard household current of 120 volts at 60 hertz. The power supply uses a digital switching means to convert the input signal into a signal with a lower voltage and higher frequency. This higher frequency current is then supplied to the lights through a step-down transformer. This higher frequency allows the system to use a greater number of lights and for the lights to be extended over greater distances from the power supply as compared to prior art power supplies.

A low voltage system is used because of the low electric shock hazard in such a system. The system can be installed outdoors without expensive conduit and around wet locations such as swimming pools, etc. These benefits outweigh any loss of efficiency as compared to a standard 120V system. The use of higher frequency does not, in and of itself, provide for longer wire lengths to the lights. However, it does make the bulk and cost of the step-down transformer reasonable. This then means that the lines can operate at 28 volts as opposed to 12 volts (the operating voltage of the lights). This greatly reduces any resistive line losses since such losses are a function of only the current in the line, and that current decreases as the voltage increases.

DETAILED DESCRIPTION OF THE INVENTION

A modular power supply for use with outdoor lighting systems will be described. In the following description numerous specific details are set forth to provide a thorough understanding of the present invention. However, it will be apparent to those skilled in the art that the present invention may be practiced without these specific details. In other instances, well known elements, such as transformers and logic gates, have not been described in detail in order to not unnecessarily obscure the present invention.

Figure 1:
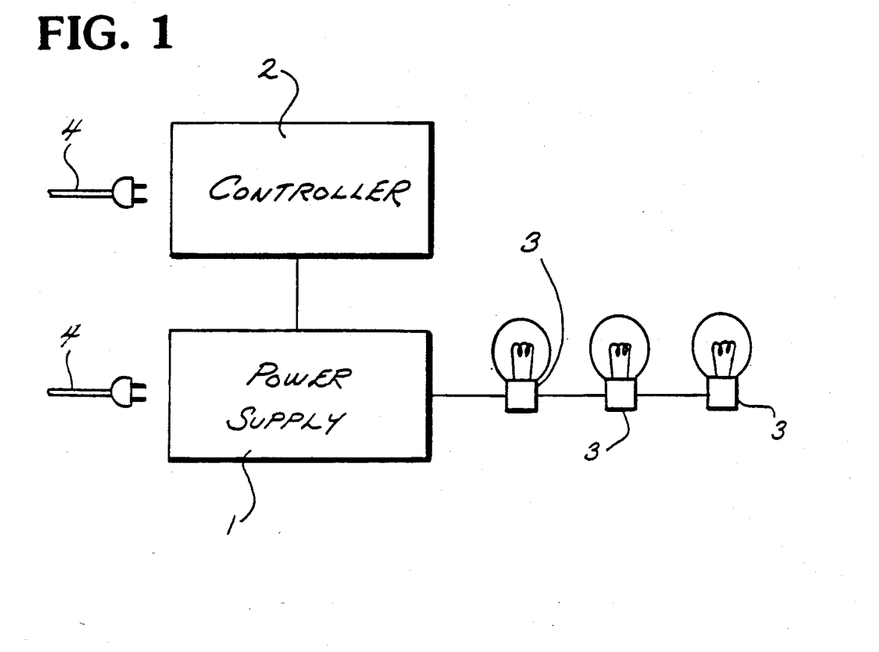
FIG. 1 is a block diagram showing the present invention in relation to other elements of an outdoor lighting system.

Referring first to FIG. 1, the present invention is shown in conjunction with other elements of an outdoor lighting system. The present invention is a power supply 1, that powers a string of light bulbs 3. The power supply may be connected to a controller 2. In the preferred embodiment, the controller will control the operation of the power supply. However, the power supply may be operated without the controller 2. Power is supplied to the power supply 1 and controller 2 through power cords 4.

Figures 2, 2A:
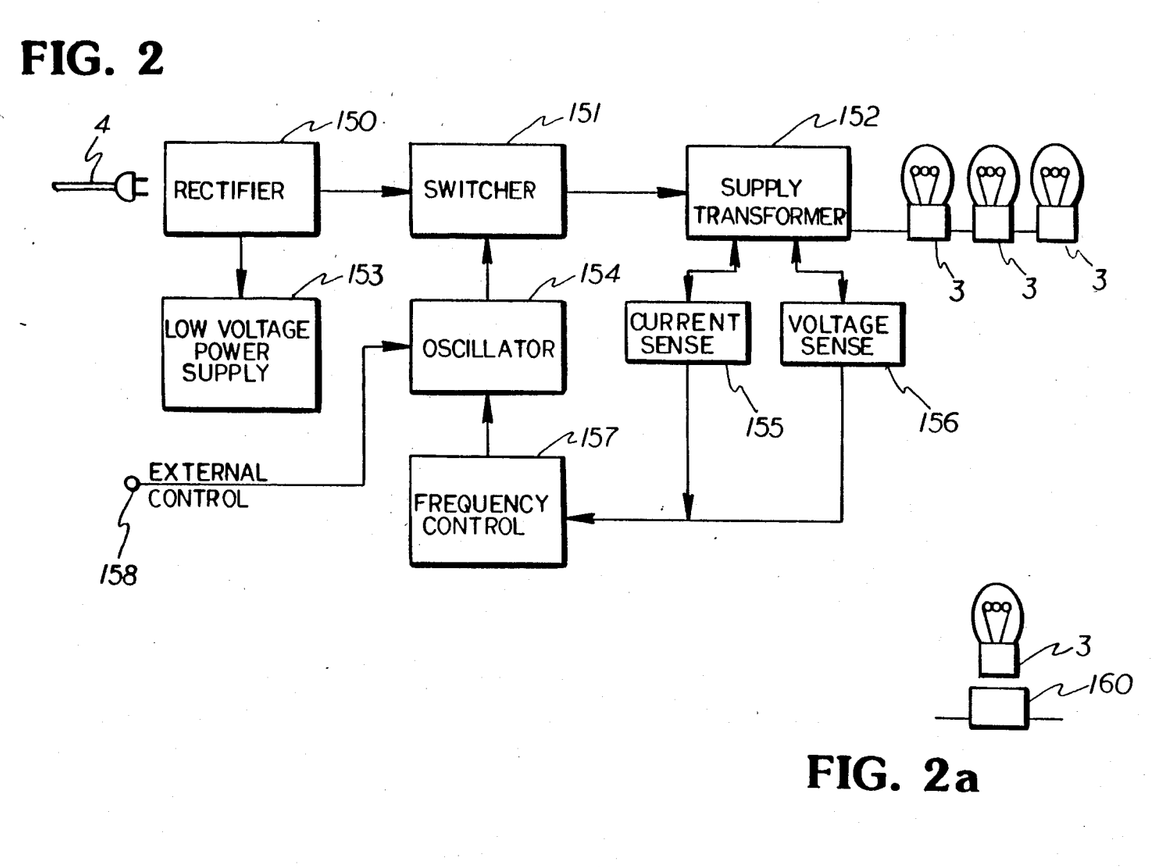
FIG. 2 is a block diagram showing the elements of the preferred embodiment of the present invention.
FIG. 2a skematically illustrates a modified detail of the circuit illustrated in FIG. 2.

Referring next to FIG. 2, a brief description of the elements of the present invention and their operation will be provided. Power enters the power supply through power cord 4. The preferred embodiment accepts standard household current of 120VAC. This input signal is full wave rectified by rectifier 150 and filtered to provide a DC signal to the switcher 151, and the low voltage power supply 153. The low voltage power supply 153 generates a low voltage signal—12 volts in the preferred embodiment—that is used by integrated circuits and other elements of the present invention. The switcher circuit 151 turns the DC signal on and off at a high frequency. The rate at which the switcher operates is controlled by the oscillator 154. The high frequency switched DC signal then enters the primary windings of the supply transformer 152. The supply transformer converts the signal into a frequency and voltage suitable for the lights 3. In the preferred embodiment, the lights operate at 28 volts.

In some instances it may be desirable to use lights that operate at a voltage different from that supplied by the transformer 152. In that case each light fixture may be supplied with an autotransformer 160 as show in FIG. 2a. The autotransformer contains a single winding with a center tap, and drops the supply voltage to the desired level. It is anticipated that lights requiring a supply voltage of 12 volts can be used. The use of the autotransformer in each light fixture allows different types of lights to be powered without altering the design of the present power supply.

Because the frequency of the switched DC signal is high, the size and bulk of the autotransformers 160 are much less than those used prior art power supplies. By way of example, the preferred embodiment uses voltage step-down transformers which will fit within a cube having sides approximately one-half inch in length. Prior art power supplies required the use of autotransformers at the lights which required cubic volumes having sides of one inch in length and greater. Thus, the autotransformers used in connection with the present invention take up only one-eighth the volume as compared to the prior art. The use of smaller transformers leads directly to a smaller overall size for the entire power supply.

The amount of current and voltage that is supplied to the lights 3 is monitored by the current sense circuit 155 and voltage sense circuit 156, respectively. The supply transformer 152 is designed such that a change in the frequency at which the switcher 151 operates will change the voltage and current to the lights. In the present invention, an increase in frequency will result in a decrease in current and voltage. The frequency of the oscillator 154, and hence the switcher 151, is controlled by the frequency control circuit 157. If either the voltage or current to the lights is outside of a predetermined range, the frequency control circuit 157 will adjust the frequency of the oscillator so as to adjust the current and voltage to their proper values. The power supply can be turned on and off by an external control signal 158. The external control signal will turn the oscillator off. That will, in turn, turn off the switcher. Without any current being supplied to the transformer, the lights will turn off.

Figure 3:
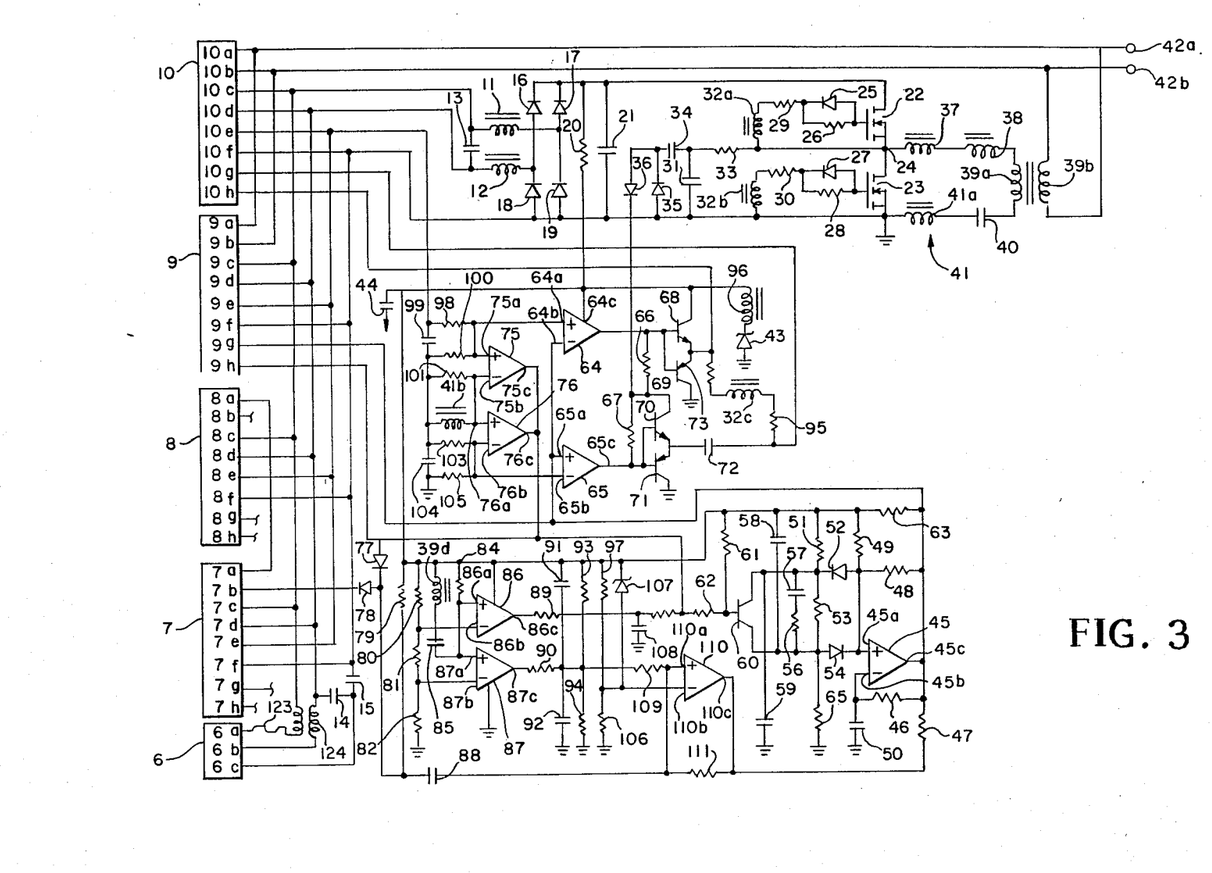
FIG. 3 is an electronic schematic showing the preferred embodiment of the present invention.

Referring next to FIG. 3, a more detailed description of the preferred embodiment of the power supply will now be provided.

POWER DISTRIBUTION

Power enters the power module through connector 6 at connector pins 6a and 6b. The module is grounded through connector pin 6c. The preferred embodiment accepts standard 120VAC household current. Connector 6 couples to power cord 4, shown in FIG. 1. Input terminal 6a is connected to fuse 123 which protects the power module from overcurrent and power surge conditions. The input 120VAC then passes through transformer 124. Transformer 124 is a common mode EMI transformer. It filters the incoming signal to reduce any switching noise that may be present. The input signal is then bussed to connector 10 at pins 10c, 10d, connector 9 at pins 9c, 9d, connector 8 at pins 8c and 8d and connector 7 at pins 7c, 7d. The signal then passes through inductors 11, 12, and capacitors 13, 14, and 15, which perform additional EMI signal filtering. Finally, the 120VAC signal enters the power switcher circuit.

POWER SWITCHER CIRCUIT

Referring again to FIG. 3 the input signal is full wave rectified by diodes 16, 17, 18, and 19. Capacitor 21 filters the rectified signal so as to present a DC voltage with little AC content to switching FET transistors 22, 23.

Transistors 22 and 23 are configured in a half-bridge mode. When transistor 22 is turned on with transistor 23 turned off, the common point 24 of transistors 22, 23, and inductor 37 is pulled to the level of the positive DC signal through transistor 22. When transistor 23 is turned on (with transistor 22 turned off), the common point 24 is pulled to ground through transistor 23. The action of turning transistors 22 and 23 on and off is performed by the Oscillator Circuit which is described below. When the common point 24 is switched to a positive DC level with respect to circuit ground, current flows through inductors 37, 38, through the primary winding 39a of output transformer 39, through capacitor 40 and through the primary winding 41a of current sense transformer 41, and back to diodes 18 and 19. Thus the power switcher circuit supplies a high frequency switched DC signal to transformer 39.

The load on the power supply is a plurality of incandescent lamps 3, as shown in FIG. 1. The lights 3 are connected across the secondary winding 39b of the output transformer 39 and are connected at output terminals 42a and 42b. In the preferred embodiment, the power module can power up to six lights at a power of 11 watts each. Output terminals 42a, 42b are also bussed to the connector 10 at connector pins 10a and 10b and connector 9 at pins 9a and 9b. The voltage and frequency of the current supplied to the lights 3 is a function of the ratio of the primary to secondary windings in transformer 39. In the preferred embodiment, these values are 28 volts and 20kHz. The present invention contemplates the use of different types of lights 3 as the load on the power supply. These lights may require a different voltage than that supplied by transformer 39. For example, it is currently contemplated that 12 volt lights will be used. Since the output of transformer 39, in the preferred embodiment, is 28 volts each fixture will include an autotransformer to reduce the voltage to 12 volts. This allows the present invention to supply power to a string of lights that requires a voltage different from that generated by transformer 39. Of course, if 28 volt lights are used, auto transformers would not be necessary at each light fixture. Also, a plurality of lights, each of which requires a different voltage, can be used without changing the design of the power supply.

However, the most conveniently available lights with appropriate brightness and longevity are 12 volt lights. Absent the invention described herein, the transformers at each fixture would be approximately 8–15 times as large as the transformers which may be used with the power supply of the present invention.

In the preferred embodiment, the values of the inductors 37, 38, capacitor 40 and the impedance of the output transformer 39 are selected such that the voltage and current flowing in the primary windings 39a of the output transformer 39 can be changed by altering the frequency at which the FET transistors 22, 23 are alternately switched on and off. In the preferred embodiment, the impedance of the circuit is primarily inductive. Therefore, by increasing the switching frequency, current and voltage at the output are restricted. This feature of the present invention allows the power switcher circuit to compensate for circuit variations such as short circuits in the lighting elements, and electrical defects and variations in the tungsten lamps that are used in the preferred embodiment. However, it will be apparent to those skilled in the art that different impedance characteristics can be used as a matter of design choice in order to allow for different types of loads.

LOW VOLTAGE POWER SUPPLY

Several elements of the power supply, such as integrated circuits, require current at a lower voltage than that used in the power switcher circuit. Therefore, the present invention includes a low voltage power supply which provides current at the required voltage.

The low voltage power supply is made up of resistor 20, Zener diode 43, capacitor 44 and inductor 96. Resistor 20 drops the high level DC to the desired low voltage. Zener diode 43 is reversed biased and is chosen such that its reverse breakdown voltage is equal to the desired low voltage level. In the preferred embodiment, this value is 12 volts. Capacitor 44 provides filtering, and inductor 96 reduces the peak value of the current entering Zener diode 43. When the power switcher circuit is operating and transistor 22 is turned on, additional current flows into the low voltage supply through diode 36, resistor 33 and capacitor 34. The amount of current delivered to the low voltage supply is dependent on the switching frequency. Resistors 29 and 30 act to prevent high frequency transients.

OSCILLATOR CIRCUIT

As noted above, the oscillator circuit controls the switching frequency of the transistors 22 and 23. Integrated circuit 45 is a voltage comparator. When power is first applied to the circuit, input pin 45b is near ground and input pin 45a is at a predetermined voltage level, which, in the preferred embodiment is slightly above 6 volts. This voltage is supplied by the low voltage power supply, as described above. When the voltage level of pin 45b is less than that of 45a, the output 45c of the voltage comparator 45 will be a positive value. After power is applied to the circuit, the voltage at pin 45b rises as the voltage on capacitor 50 increases as capacitor 50 is charged by the flow of current from the low voltage power supply through pullup resistor 63 and through charge/discharge resistor 46 to a voltage level slightly more than that of pin 45a. When pin 45b is at a higher voltage level than 45a, output 45c changes to a voltage level near ground. At that point, the voltage level of input 45b will decrease as the voltage on capacitor 50 decreases as capacitor 50 is discharged by a flow of current through charge/discharge resistor 46, through the current sink of integrated circuit 45 at 45c and to ground to a point where it is slightly less than input 45a, at which time it will again rise. Input 45a will alternate between two voltage states depending on the condition of output 45c. When output 45c is at or near ground, input 45a will be at a low voltage state determined by the value of resistors 48, 51, and 53. When output 45c is at a positive voltage level, input 45a will be at a high voltage state established by the resistor ratios of elements 48, 53, and 55. In the preferred embodiment, voltage comparator 45 is of the open collector type. Thus, output 45c will oscillate at a fixed frequency that is predetermined by the value of the above-mentioned resistors. Output 45c will be a square wave of that predetermined frequency.

Output 45c is connected to an amplifier circuit to drive the switching transistors 22, 23. Specifically, output 45c is connected to input pins 64b and 65a of integrated circuits 64 and 65, respectively. Integrated circuits 64 and 65 are voltage comparators. Input pins 64a and 65b are biased to predetermined voltage levels by resistors 98, 100, 103, and 105 and filter capacitors 99 and 104. In the preferred embodiment input pin 64a is biased to slightly above 6 volts and input pin 64b is biased slightly below 6 volts. When the square wave signal at output 45c is at a high level, output 64c goes low while output 65c stays high. Conversely when output 45c is at a level near ground, output 65c goes low and output 64c goes high. Resistors 66 and 67 are pullup resistors and bring the output signals 64c and 65c to 12 volts in the preferred embodiment. Transistors 68, 69, 70, 71 are amplifiers. In the preferred embodiment, transistors 68, 69, 70, 71 are emmitter follower current amplifiers. The resulting square wave signal has the entire DC component blocked by capacitor 72 and then drives the primary windings 32c of transformer 32 through resistors 73 and 95.

The secondary windings 32a and 32b of transformer 32 are chosen such that when current flows in one direction through the primary, a positive signal will be presented to the gate of switching transistor 22 and a negative signal will be presented to the gate of switching transistor 23. When current flows in the opposite direction through the primary, the polarity of the signals is reversed. Resistors 29 and 30 prevent stray oscillations. Diodes 25, 27, and resistors 26 and 28 provide a time delay to prevent one transistor from turning on during the storage time of the transistor which is being turned off. Thus the transistors are driven by the oscillator circuit in a complimentary fashion.

FREQUENCY CONTROL

As shown, the operating frequency of the oscillator is determined by the resistor ratios of resistors 46, 51, 53, and 55, and the capacitance of capacitor 50. In the preferred embodiment this frequency is 20kHz. The operating frequency is not fixed and can be changed by passing current through transistor 60 and thus altering the voltage drop across resistor 53. This is accomplished by turning on transistor 60 and passing current through resistors 61 and 62 to ground. When less voltage exists across resistor 53, the voltage level on pin 45a of voltage comparator 45 is reduced in the high voltage state and increased in the low voltage state. The voltage boundaries on the inputs 45a, 45b to the voltage comparator 45 are reduced. It takes less time for capacitor 50 to reach these boundaries during charging and discharging, and the operating frequency of the square wave oscillator increases. Thus, it will be appreciated that the exact frequency of the power oscillator can be controlled by pulling current through resistor 62 to ground.

OVERCURRENT PROTECTION

There are at least two events that may cause the load to attempt to draw an unacceptable amount of current from the power supply. The first of these is when a short circuit exists in the load. The second occurs when power is initially applied to the load and the filaments of the light bulbs are cold. The preferred embodiment uses tungsten filament bulbs. The tungsten filaments have a very low resistance when they are cold. Thus, when power is first applied, the lights will try to draw more current than the power supply can deliver. During these events, the current to the load is maintained at a safe and reliable level by increasing the operating frequency of the oscillator. As noted above, a change in the oscillator frequency will change the output impedance, and hence the current, of the power switcher circuit. This change is accomplished by monitoring the current in the primary windings 39a of the output transformer 39 through current sense transformer 41. Transformer 41b is a secondary winding of transformer 41 having a primary winding 41a. The secondary windings 41b are coupled across resistor 101 such that a proportional representation of the current in the load is seen across resistor 101. Integrated circuits 75 and 76 are voltage comparators. One side of resistor 98 is connected to input pins 75b and 76a on voltage comparators 75 and 76, respectively. The other inputs are biased to predetermined voltage levels, and in the preferred embodiment input 75a is biased slightly above 6 volts and input 76b is biased slightly below 6 volts. The outputs 75c and 76c of the voltage comparators are connected together and then connected to resistor 62. The voltage comparators 75 and 76 are configured as a window detector. If the variations in the load current exceeds the allowable levels as established by resistors 98, 100, 103, and 105, one of the outputs, 75c or 76c, of the voltage comparators will go to ground. As noted above, these outputs are connected to resistor 62. Thus, when the load current exceeds acceptable levels, current will flow through resistor 62, turning on transistor 60, resulting in an increase of the operating frequency of the oscillator. Therefore, the frequency at which transistors 22 and 23 are driven increases, thereby limiting the current available in the event of a short circuit or during initial turning on of the lights Capacitors 58 and 59 act as filters. Resistor 56 and capacitor 57 make up a time delay circuit to provide loop stability so that output current will be maintained at a safe level.

VOLTAGE REGULATION CIRCUIT

Input 86b of voltage comparator 86 is tied to the common point of resistors 80 and 81. Input 86b is biased at a voltage level determined by the value of resistors 80, 81, and 82. Transformer 39d reflects the voltage level of the high frequency output of transformer 39. Transformer 39d is a secondary winding of transformer 39. Transformer 39d is connected between capacitor 85 and the reference voltage, line at the anode of diode 36 which reference voltage is 12 volts. The voltage at the end of the transformer that is connected to capacitor 85 is allowed to vary above and below the reference voltage. Capacitor 85 is also connected to input 86a of voltage comparator 86 and resistor 84. Capacitor 85 and resistor 84 form a frequency sensitive network which compensates for different waveforms that are seen for different oscillator frequencies.

When the voltage to the load exceeds a predetermined maximum level, the voltage of input 86a will drop below that of 86b. When this occurs, the output 86c of voltage comparator 86 will sink current through resistor 62. The amount of current that voltage comparator 86 draws will be limited only by the value of resistor 89 and the voltage on capacitor 108. As noted above, when current is drawn through resistor 62, the frequency of the oscillator circuit changes, thus changing voltage across the load. In this feedback circuit the voltage on capacitor 108 will drop to a level necessary to maintain the desired voltage output.

OVERVOLTAGE PROTECTION CIRCUIT

Whenever there is a very light load, or no load, the voltage regulation circuit is incapable of properly maintaining the output voltage. This is because the oscillator control circuit cannot drive the switching frequency high enough to insert the necessary series impedance in the output. In this event, capacitor 108 becomes totally discharged and the voltage at the end transformer 39d connected to capacitor 85 goes lower than the voltage on input 87b of voltage comparator 87. This voltage level on input 87b is fixed by the voltage divider made up of resistors 80, 81, 82. Transformer 39d is connected to input 87a. When the voltage level of input 87a falls below that of 87b, the output 87c of voltage comparator 87 will go to a low voltage level and sink current through resistor 90.

Under normal operating conditions, output 87c, being open collector, draws no current and there is no voltage drop across resistor 90. Furthermore the common point of resistors 90, 93, 94, 109, and capacitors 91 and 92 is biased at one half of the reference level—i.e., to 6 volts in the preferred embodiment—due to the values chosen for resistors 93 and 94. Also, there is no voltage drop across resistor 109 because no DC current is flowing through resistor 111 since the output of integrated circuit 110 at 110c is at the same effective voltage potential as the input at 110a. Input 110 is biased at close to one half of the previously mentioned reference voltage by resistors 97 and 94 and by the lack of a voltage drop across resistor 108. The output 110c varies from ground to reference voltage and back in square wave oscillation from the output of the oscillator at 45c across a low impedance resistor 47. The other side of high impedance resistor 111 is connected to capacitor 88, which is in turn connected to the reference voltage through a low impedance resistor 79. As a result, the AC signal on 110c is integrated by high impedance resistor 111 and capacitor 88 to provide a composite DC voltage of close to one half of the reference voltage at 110a. Also, input 110b is biased by resistors 97 and 106 and Zener diode 107 to a voltage less than one half of the reference voltage, such that the output 110c remains open, or free to vary between ground and the reference voltage.

When output 87c is driven low, as described above, current flows through resistors 109 and 90. This drives the voltage level of input 110a below the level of input 110b. Output 110c than goes low and begins to sink current through resistor 47. Resistor 47 is chosen such that, when output 110c is drawing current, the output 45c of voltage comparator 45 can not go high enough to allow oscillation, effectively shutting off the oscillator and the power supply. Because of the values chosen for resistors 90, 93, 94, and 109, the output 110c of voltage comparator 110 remains latched in the low condition. Turning the power supply off and then reapplying power will reset the oscillator through capacitor 88 as described in the on/off control circuit below.

ON/OFF CONTROL CIRCUIT

The common point of diodes 77, 78, resistor 79, and capacitor 88 is normally biased to the level of the reference voltage by resistor 79. As mentioned in the preferred embodiment this voltage level is 12 volts. When connector pin 7b is brought to ground by an external device, the voltage level of input 110a of voltage comparator 110 will be driven lower than that of input 110b. As discussed above, this will cause output 110c to sink current and will shut off the power supply.

When connector pin 7b is allowed to float at a high voltage level, a positive pulse is coupled to input 110a through capacitor 88. This results in output 110c going high. During this time the oscillator circuit will run. If there is no overvoltage condition input 110a will remain high, as described above, and the oscillator will continue to run.

OVERTEMPERATURE SENSOR

Thermistor 97 is positioned in the circuit to detect excessive heat. When the temperature remains below a predetermined maximum the resistance of the thermistor is high. Because of the values chosen for thermistor 97, resistor 106 and Zener diode 107, input 110b of voltage comparator 110 is normally biased lower than that of input 110a. In the preferred embodiment, input 110a is normally at 6 volts and input 110b is normally at 5.2 volts. At maximum allowable temperature, thermistor 97 conducts more current. This results in the voltage level of input 110b exceeding that of 110a. This, in turn, causes output 110c to go low. As described above, this will turn off the oscillator.

After the circuit has turned off the oscillator due to excessive heat, the oscillator will remain latched off, even after the temperature subsides. Turning the power supply off and then reapplying power as described above will reset the circuit, provided that the temperature no longer exceeds the maximum allowable level.

ADDITIONAL MODULES

Figure 4:
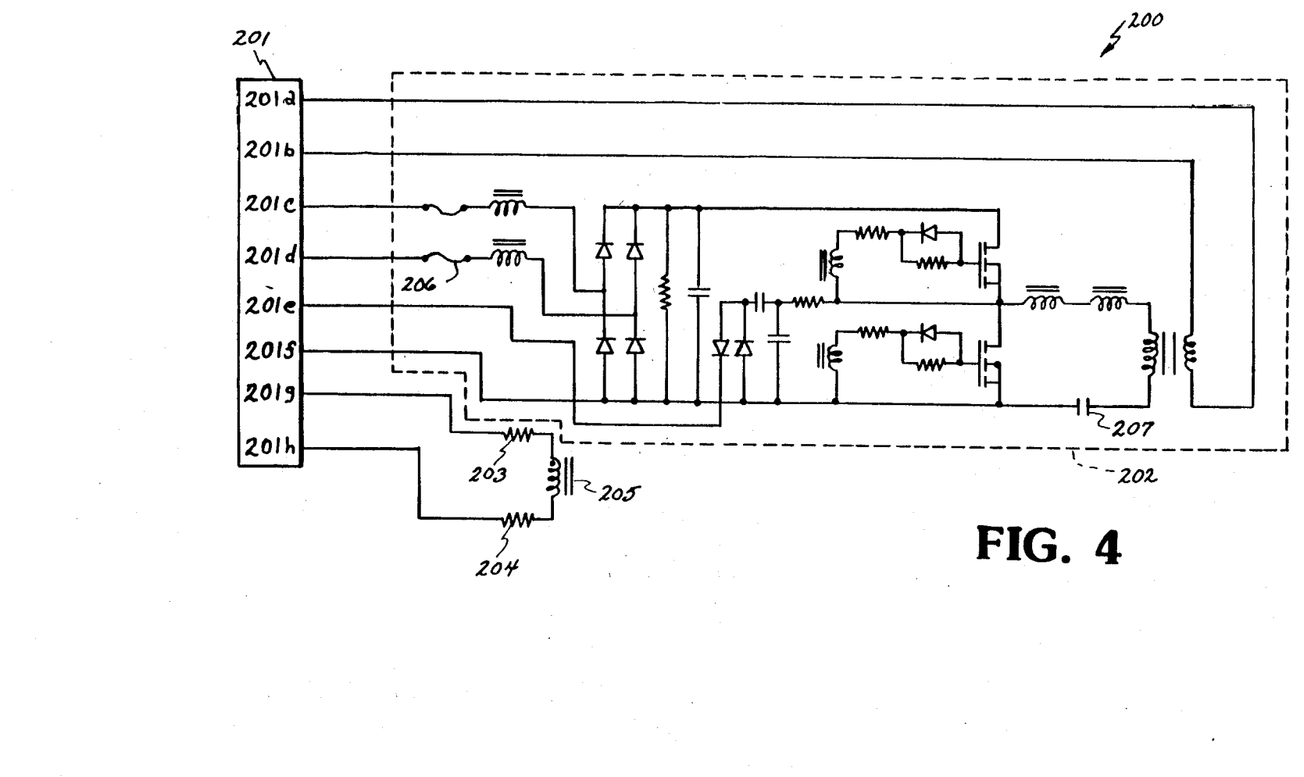
FIG. 4 is a schematic diagram of a an additional module which may be added to the present invention.

Referring next to FIG. 4, a modular power unit 200 is illustrated. It can be connected to the main power module. Connector 201 connects to connector 9 of the main power module. The modular power unit 200 supplies additional power so that an increased number of lights can be driven from terminals 42a, 42b of the main power module. In the preferred embodiment, the modular power unit 200 allows up to 6 additional lights to be driven. The modular power unit 200 is a slave unit and cannot be operated without the main power module.

The modular power unit 200 contains a power generation circuit 202 that is identical to the Power Distribution and Power Switcher circuits of the power module, with the single exception that an additional fuse 206 is added to prevent damage due to power surges and overcurrent conditions. The modular power unit 200 also comprises resistors 203, 204 and transformer 205. Transformer 205 is connected to the oscillator circuit 154 of the main power module and is the primary winding of the transformer used to drive the FETs in the power switcher circuit of the modular power unit 200.

Figure 5:
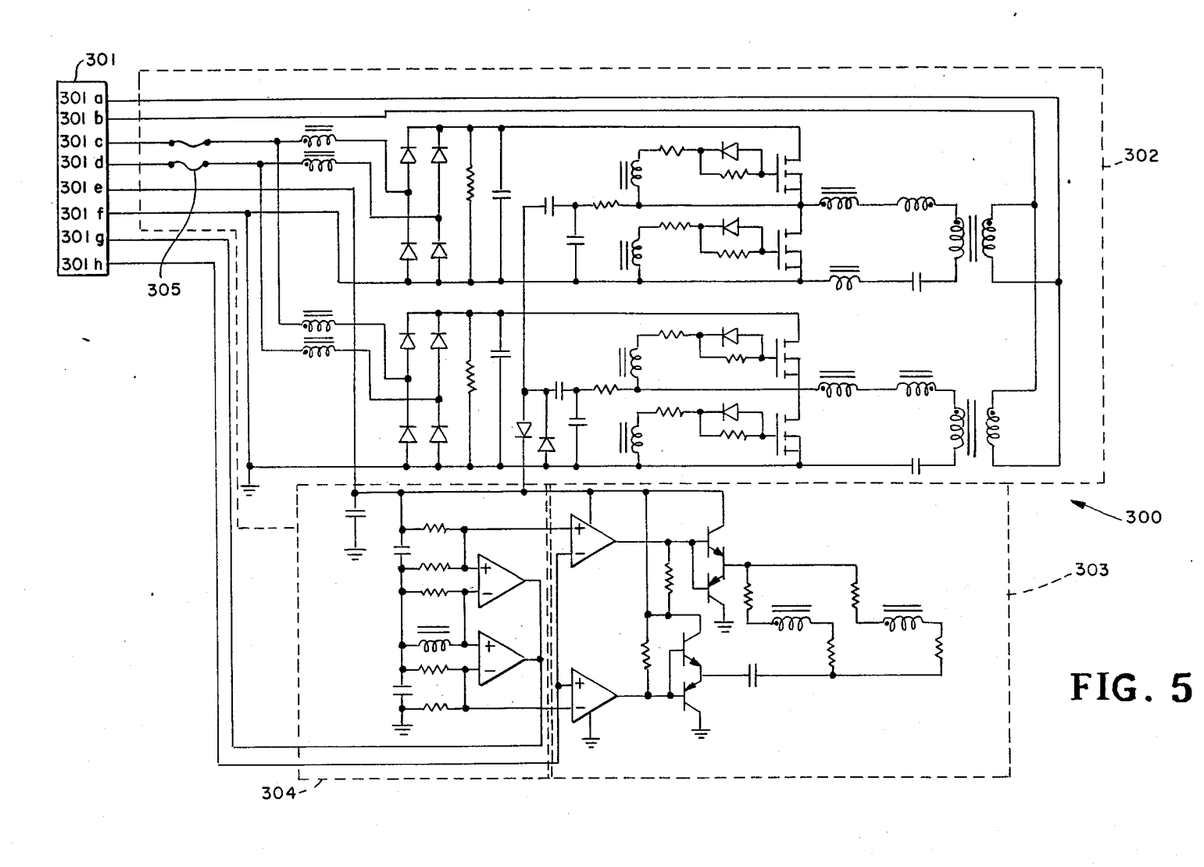
FIG. 5 is a schematic diagram of a second additional module which may be added to the present invention.

Referring next to FIG. 5, a second additional module which can be added to the present invention is illustrated. This modular power board 300 is also a slave unit and cannot operate without the main power module. This unit supplies enough power for up to 12 additional lights, is the preferred embodiment. The modular power board 300 connects to connector 8 of the main power module through connector 301.

The modular power board 300 contains a power generation circuit 302 that is made up of two power switcher circuits which are identical to power switcher circuit 151. These circuits operate exactly as in the main power module, and are described fully above. An additional fuse 305 is added to protect circuit power surges and overcurrent conditions. The power generation circuit 302 is connected to terminals 42a and 42b of the main power module through connector pins 301a and 301b. Circuit 303 is identical to the amplifier section of the oscillator circuit 154 that is in the main power module. It operates as described above. Circuit 303 is connected to the oscillator in the main power module through connector pin 301h. Circuit 304 is a current sense circuit. It is connected to the frequency control circuit 157 on the main power module through connector pin 301g. The current sense circuit 304 monitors the current supplied to the lights by the power generation circuit 302.

I claim:

1. A power supply for supplying electric current to lighting system, said system having a plurality of lights, comprising:
    connector means for accepting electrical power from an external source, said electrical power having a first frequency and a first voltage;
    rectifier means coupled to said connector means for converting said electrical current into a DC signal;
    switching means connected to said rectifier means for converting the DC signal into a further signal having pulses of alternating polarity;
    oscillator means connected to said switching means for operating said switching means at a second frequency;
    a first transformer having primary a secondary windings for supplying said further signal to said lights at a second voltage, said primary windings of said first transformer being connected to said switching means and said secondary windings of said first transformer being connected to said lights;
    a low voltage power supply means for generating a fourth voltage, said low voltage power supply means being coupled to said rectifier means;
    control means for changing said second frequency, said control means having an input and an output connected to said oscillator; and
    current detection means for sensing current drawn by said plurality of lights, said current detection means being coupled to said input of said control means such that when said current is outside of a predetermined range said second frequency is changed.

2. The power supply of claim 1 further comprising at least one second transformer said second transformer being connected between said first transformer and one of said plurality of lights and supplying a third voltage, said third voltage being different from said second voltage.

3. The power supply of claim 2 wherein said first voltage is approximately 120 volts, said second voltage is approximately 28 volts and said third and fourth voltages are approximately 12 volts.

4. The power supply of claim 3 wherein said first frequency is less than said second frequency.

5. The power supply of claim 4 wherein said first frequency is approximately 60 Hertz and said second frequency is approximately 20 kilohertz.

6. The power supply of claim 1 further comprising:
    voltage detection means for sensing said second voltage, said voltage detection means being coupled to said input of said control means such that when said second voltage is outside of a predetermined range said second frequency is changed.

7. The power supply of claim 6 wherein said oscillator means comprises a voltage comparator having an output, at least one resistor, a capacitor, and a third transformer having a primary and at least one secondary winding, wherein said at least one resistor is coupled to said low voltage power supply means and wherein said at least one resistor, said capacitor and said voltage comparator are coupled together such that said output of said voltage comparator continuously varies between a first and a second state at said second frequency and wherein said output of said voltage comparator is coupled to said primary winding of said third transformer and said at least one secondary winding is coupled to said switching means.

8. The power supply of claim 7 comprising first, second, and third, resistors wherein said voltage comparator has first and second inputs, said first resistor has first and second ends and said capacitor has first and second ends and wherein said first end of said first resistor is coupled to said low voltage supply means and said second end of said first resistor is coupled to said first input, and wherein said second end of said capacitor is connected to said second input and said first end of said capacitor is connected to a ground potential, and wherein said second resistor is connected between said output of said voltage comparator and said second end of said first resistor and said third resistor is connected between said output of said voltage comparator and said second and of said capacitor.

9. The power supply of claim 7 wherein said third transformer has first and second secondary windings and said switching means comprises first and second transistors, said first secondary winding being coupled to the control input of said first transistor and said second secondary winding being coupled to the control input of said second transistor, and wherein said secondary windings interact with said primary winding of said third transformer such that when a current is flowing in said primary winding a current in said first secondary winding flows in a direction opposite to a current in said secondary winding.

10. The power supply of claim 9 further comprising an amplifier means connected between said output of said voltage comparator and said primary winding of said third transformer for increasing the current in said primary winding such that the current in said secondary windings of said third transformer are sufficient to turn on said first and second transistors.

11. A power supply for lighting system comprising:
connector means for accepting electrical current from an external source, said electrical current having a first frequency and a first voltage;
rectifier means for converting said electrical current into a DC signal having a second voltage;
switching means connected to said rectifier means for converting the DC signal into a further signal hving pulses of alternating polarity, the frequency of said second signal being of a second magnitude when compared to said first frequency of said electrical power;
output means for supplying said further signal, at said second frequency, to said lighting system;
control means for changing said second frequency, said control means having an input and an output connected to said switching means; and
current detection means for sensing a current drawn by said lighting system, said current detection means being coupled to said input of said control means such that when said current is outside of a predetermined range, said second frequency is changed.

12. The power supply of claim 11 wherein said lighting system comprises a plurality of outdoor lights connected in parallel.

13. The power supply of claim 12 wherein said first frequency is less than said second frequency.

14. The power supply of claim 13 wherein said first voltage is greater than said second voltage.

15. The power supply of claim 14 wherein said first voltage is approximately 120 volts and said first frequency is approximately 60 hertz.

16. The power supply of claim 14 wherein said output means comprises a first transformer.

17. The power supply of claim 16 further comprising at least one second transformer, said second transformer being connected to one of said plurality of lights and supplying a third voltage to said light, said third voltage being different from said second voltage.

18. The power supply of claim 17 wherein said second voltage is approximately 28 volts, said third voltage is approximately 12 volts, and said second frequency is approximately 20 kilohertz.

19. The power supply of claim 11 further including voltage detection means for sensing said second voltage, said voltage detection means being coupled to said input of said control means such that when said second voltage is outside of a predetermined range, said second frequency is changed.

20. The power supply of claim 1 wherein said current detection means comprises current sensitive means electrically connected in series with said first transformer;
voltage comparison means having first and second inputs and an output electrically connected to said control means;
first resistance means electrically connected in series with said first input;
means to vary the current through said first resistance means in response to changes in the current through said current sensitive means;
said voltage comparison means transmitting current from said input to said output when the magnitude of said current at said input exceeds a predetermined limit.

21. The power supply of claim 20 wherein said current sensitive means comprises a fourth transformer having a primary winding electrically connected in series with said first transformer.

22. The power supply of claim 6 wherein said voltage detection means includes second voltage comparison means having first and second inputs and an output and voltage sensitive means electrically connected in series with one of said inputs, said voltage sensitive means changing the magnitude of the voltage signal delivered to said one input in accordance with the magnitude of said second voltage.

23. The power supply of claim 1 further including temperature responsive means electrically connected to an input of said oscillator means;
third voltage comparison means having first and second inputs and an output electrically connected to said oscillator means, the magnitude of the current conducted by said temperature responsive means increasing as the sensed temperature increases such that when the sensed temperature exceeds a predetermined limit said third voltage comparison means electrically changes the frequency of operation of said oscillator means.

24. The power supply of claim 23 wherein the frequency of operation of said oscillator means becomes null.

25. The power supply of claim 23 wherein said temperature responsive means is a negative temperature coefficient resistance element.

26. A method of supplying electric current to a lighting system having a plurality of lights comprising the steps of:
connecting the lighting system to an external source of electrical power supplied at a first frequency and a first voltage;
converting the electrical current of said external source of electrical power into a DC signal;
converting the DC signal into a signal having pulses of alternating polarity to provide a further signal having a frequency at a magnitude different from the frequency of said electrical power;
transmitting the further signal at said second frequency to a transformer for reducing the voltage of said signal;
transmitting the reduced voltage signal to said plurality of lights;

detecting the current of said reduced voltage signal transmitted to said plurality of lights; and varying the second frequency of said further signal such that when said current is greater than a predetermined magnitude said second frequency is changed.

27. A method of supplying electrical power to a lighting system in accordance with claim 26 further including detecting the voltage of the signal transmitted to the plurality of lights; and varying the second frequency of said signal when the sensed second voltage is outside of a predetermined range.

* * * * *